US011198266B2

(12) United States Patent
Mancini

(10) Patent No.: US 11,198,266 B2
(45) Date of Patent: Dec. 14, 2021

(54) PROCESS AND PLANT FOR BUILDING GREEN TYRES FOR VEHICLE WHEELS

(71) Applicant: PIRELLI TYRE S.P.A., Milan (IT)

(72) Inventor: Gianni Mancini, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 338 days.

(21) Appl. No.: 16/212,328

(22) Filed: Dec. 6, 2018

(65) Prior Publication Data

US 2019/0152177 A1 May 23, 2019

Related U.S. Application Data

(63) Continuation of application No. 13/515,593, filed as application No. PCT/IB2010/003337 on Dec. 21, 2010, now abandoned.
(Continued)

(30) Foreign Application Priority Data

Dec. 22, 2009 (IT) ........................... MI2009A002270

(51) Int. Cl.
*B29D 30/00* (2006.01)

(52) U.S. Cl.
CPC ................... *B29D 30/005* (2013.01)

(58) Field of Classification Search
CPC .. B29D 30/00; B29D 30/0016; B29D 30/005; B29D 30/08; B29D 30/10; B29D 30/20;
(Continued)

(56) References Cited

U.S. PATENT DOCUMENTS

| 3,570,573 A | 3/1971 | Marker |
|---|---|---|
| 3,892,113 A | 7/1975 | Bauer |
(Continued)

FOREIGN PATENT DOCUMENTS

| CN | 101189120 A | 5/2008 |
|---|---|---|
| EP | 0 448 407 A2 | 9/1991 |
(Continued)

OTHER PUBLICATIONS

Horst Sergel, EP 0776756 A2, updated machine translation. (Year: 1997).*
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

There are disclosed a plant and a process for building different types of green tyres, the process comprising:
a) building a carcass structure of a green tyre;
b) building a crown structure of a green tyre;
wherein at least one between the building of the carcass structure and the building of the crown structure comprises:
c) providing at least one first feeding unit of a first elementary semi-finished product and one second feeding unit of a second elementary semi-finished product, the at least one first and one second elementary semi-finished products being different to one another;
d) building at least one portion of a structural component of the tyre being processed starting from at least one of the first and second elementary semi-finished products, in one work station fed by the first and second feeding units of the first and second elementary semi-finished products.

20 Claims, 2 Drawing Sheets

Related U.S. Application Data

(60) Provisional application No. 61/282,167, filed on Dec. 23, 2009.

(58) Field of Classification Search
CPC .... B29D 30/2607; B29D 30/38; B29D 30/46; B29D 2030/0022; B29D 2030/0038; B29D 2030/082; B29D 2030/086; B29D 2030/381
USPC ............................ 156/110.1, 111, 394.1, 396
See application file for complete search history.

(56) References Cited

U.S. PATENT DOCUMENTS

| | | | |
|---|---|---|---|
| 4,090,835 | A | 5/1978 | Bronson |
| 4,159,363 | A | 6/1979 | Elmer |
| 4,314,864 | A | 2/1982 | Loeffler |
| 4,881,634 | A | 11/1989 | Stolzer |
| 5,341,996 | A | 8/1994 | Rutherford |
| 5,554,242 | A | 9/1996 | Brown |
| 5,822,210 | A | 10/1998 | Kobaysashi |
| 6,251,204 | B1 | 6/2001 | Andersson |
| 6,474,384 | B1 | 11/2002 | Iida |
| 6,659,798 | B2 | 12/2003 | Okada |
| 2003/0170336 | A1 | 9/2003 | Caretta |
| 2005/0076758 | A1 | 4/2005 | Dale |
| 2007/0068617 | A1 | 3/2007 | De Paoli |
| 2007/0175567 | A1 | 8/2007 | Stahl |
| 2008/0066850 | A1 | 3/2008 | Seevers |
| 2008/0190549 | A1 | 8/2008 | Takagi |
| 2008/0190562 | A1 | 8/2008 | Winkler |
| 2008/0196817 | A1 | 8/2008 | Mancini |
| 2008/0283166 | A1 | 11/2008 | Mafune |

FOREIGN PATENT DOCUMENTS

| | | |
|---|---|---|
| EP | 0 776 756 A2 | 6/1997 |
| JP | 60-82556 | 5/1985 |
| JP | 01-141727 | 6/1989 |
| JP | 3-270835 | 12/1991 |
| JP | 9-174712 | 7/1997 |
| JP | 2003-534160 | 11/2003 |
| JP | 2006-297778 | 11/2006 |
| KR | 10-2007-0091014 | 9/2007 |
| RU | 2 222 431 C2 | 1/2004 |
| WO | WO 99/64225 A1 | 12/1999 |
| WO | WO 01/32409 A1 | 5/2001 |
| WO | WO 01/38077 | 5/2001 |
| WO | WO 02/094545 | 11/2002 |
| WO | WO 06/033120 | 3/2006 |
| WO | WO 2006/129326 A1 | 12/2006 |
| WO | WO 08/099236 | 8/2008 |
| WO | WO 2009/040594 A1 | 4/2009 |
| WO | WO 2009/075576 | 6/2009 |
| WO | WO 2009/081220 A1 | 7/2009 |
| WO | WO 2009/157028 A1 | 12/2009 |

OTHER PUBLICATIONS

International Search Report from the European Patent Office in International Application No. PCT/IB2010/00337 dated May 25, 2011.

Written Opinion from the European Patent Office in International Application No. PCT/IB2010/003337 dated Jun. 22, 2012.

Notification of the First Office Action from the State Intellectual Property Office of the People's Republic of China for Chinese Patent Application No. 201080058358.X dated Apr. 15, 2014.

English translation of Notice of Reasons for Rejection issued by the Japanese Patent Office for Japanese Patent Application No. 2012-545466 dated Oct. 9, 2014.

Notice of Preliminary Rejection from the Korean Intellectual Property Office, in counterpart Korean Application No. 10-2012-7017315 dated Apr. 24, 2017.

Machine generated English language translation of JP 60-82556 (original document dated May 1985) (Year: 1985).

Machine generated English language translation of JP 2006-297778 (original document dated Nov. 2006).

English language translation of EP 776756 (original document dated Jun. 1997).

English translation of JP 01-141727 (original document dated Jun. 1989).

Seminar on Energy Conservation in Ruber Industry, United Nations Industrial Development Organization (UNIDO), The Energy Conservation Center, Japan, 1998, pp. 1-21.

Machine generated English language translation of EP 0776756 (original document dated Jun. 1997).

\* cited by examiner

PROCESS AND PLANT FOR BUILDING GREEN TYRES FOR VEHICLE WHEELS

CROSS REFERENCE TO RELATED APPLICATIONS

This application is a Continuation Application of U.S. patent application Ser. No. 13/515,593, filed Jun. 13, 2012, which claims the priority of a national phase application based on PCT/IB2010/003337, filed Dec. 21, 2010, which claims the priority of Italian Patent Application No. MI2009A002270, filed Dec. 22, 2009, and the benefit of U.S. Provisional Application No. 61/282,167, filed Dec. 23, 2009, the content of all of which is incorporated herein by reference.

The present invention relates to a process and a method for building green tyres for vehicle wheels. In particular, the present invention relates to a process and a method for building green tyres by using elementary semi-finished products.

The present invention also relates to a plant for building green tyres for vehicle wheels, usable for carrying out the above mentioned building process.

Tyre production cycles envisage that, after a building process wherein the various components of the tyre itself are made and/or assembled in one or more building lines, a moulding and vulcanization process is carried out in a suitable vulcanization line, adapted to define the tyre structure according to desired tread geometry and design.

A tyre generally comprises a toroidally ring-shaped carcass structure including one or more carcass plies, strengthened with reinforcing cords lying in substantially radial planes (a radial plane contains the rotation axis of the tyre). Each carcass ply has its ends integrally associated with at least one metal reinforcing annular structure, known as bead core, constituting the reinforcing of the beads, i.e. the radially inner ends of the tyre having the function of enabling the assembling of the tyre with a corresponding mounting rim. Placed crown wise to said carcass is a band of elastomeric material, called tread band, within which, at the end of the moulding and vulcanization steps, a raised pattern is formed for ground contact. A reinforcing structure, generally known as belt structure, is arranged between the carcass and the tread band. Such structure usually comprises, in the case of tyres for cars, at least two radially overlapped strips of rubber fabric provided with reinforcing cords, usually of metal, arranged parallel to each other in each strip and crossed with the cords of the adjacent strip, preferably symmetrical to the equatorial plane of the tyre. Preferably, the belt structure further comprises in radially outer position, at least on the ends of the underlying belt strips, also a third layer of textile or metal cords, arranged circumferentially (at 0 degrees).

Finally, in tyres of the tubeless type, a radially inner layer, called liner, is present which has imperviousness features for ensuring the air-tightness of the tyre itself.

To the aims of the present invention and in the following claims, by the term "elastomeric material" it is intended a composition comprising at least one elastomeric polymer and at least one reinforcing filler. Preferably, such composition further comprises additives such as cross-linking and/or plasticizing agents. By virtue of the cross-linking agents, such material may be cross-linked by heating, so as to form the final manufactured article.

In the present context, by the term "green tyre" it is meant a tyre obtained by the building process and not yet vulcanized.

In the present description and in the following claims, by "elementary semi-finished products" it is meant continuous elongated elements of elastomeric material having at least one textile or metal reinforcing cord therein, and/or strips of elastomeric material generally called "strip-like elements" obtained by cutting said continuous elongated elements to size. Generally, such semi-finished products are laid reciprocally side by side, especially in the case of strip-like elements that for example contribute to forming carcass plies, belt strips, and some types of reinforcements. Preferably, such side by side reciprocal laying takes place on a substantially cylindrical and/or substantially toroidal and/or substantially flat laying surface.

In the present description, by "technological flexibility" it is meant the possibility of using for each tyre elementary semi-finished products differing by type of elastomeric material or by type of textile cord or metal reinforcing cord.

To the aims of the present invention and in the following claims, by the term "structural component" of the tyre it is meant any component adapted to carry out a function in the tyre, for example selected among: liner, sub-liner, carcass ply/plies, under-belt insert, belt strips either crossed or at zero degrees, connecting skim coat for the tread band, tread band, bead core, bead filler, reinforcing inserts made of textile or metal or elastomeric material only, abrasion-proof insert, sidewall inserts.

To the aims of the present invention and in the following claims, the term "size" of the tyre means the set of geometrical features that characterises a tyre, that is, at least tread band width, sidewall height, fitting diameter.

In the present description and in the following claims, by "type" of tyre it is meant the set of structural features (such as for example one- or two-ply structure, radial or with crossed carcass plies, with or without belt structure, type of belt structure—with crossed belts, zero degrees, crossed belts and zero degrees—, type of tread band with one or more layers etc.), and technological features (such as for example mixture of the various structural components, materials constituting the textile or metal reinforcing cords, type of formation of the reinforcing cords, etcetera).

EP 0 776.756 A1 describes an apparatus for manufacturing tyres for vehicle wheels having a carcass assembly with an inner layer, at least one carcass ply, two side portions and two beads having a crown structure with at least one belt strip and a tread band layer, wherein at least one carcass manufacturing station and/or a belt manufacturing station is provided with at least two connection devices, which may be controlled independently of one another for the connection with the materials, which are identical in nature, and at least one feeding device for feeding identical components, associated with each connection device.

WO 01/32409, in the name of the same Applicant, describes a tyre building line provided with working stations, each arranged to make and assemble at least one structural component of the tyre being processed, wherein at least one series of tyres is treated at the same time, comprising at least one first and a second type of tyres differing from each other, and wherein the tyre transfer to the vulcanization line is carried out through robotized arms and according to a transferring rate equal to the transferring rate of the tyres to each of said working stations.

WO 09/040594, in the name of the same Applicant, describes a process for producing tyres for vehicle wheels comprising the steps of: a) building a carcass structure of a green tyre on a first forming drum; b) building a crown structure of a green tyre on at least one second forming drum; c) toroidally shaping said carcass structure assembling it to said crown structure in at least one station for shaping and assembling the tyre being processed, wherein said assembly and shaping station is synchronised with the building line of the carcass structure and with the building line of the crown structure and wherein each carcass structure is associated with the respective first forming drum whereon it is built until the end of step c) of shaping and assembling the tyre being processed; d) moulding and curing the green shaped tyre.

US 2007/0175567 describes an apparatus for building tyres comprising a movement system for sequentially moving conveyors along an assembly path; and a plurality of stations for applying components spaced along the path for applying green tyre components to each conveyor, each station comprising: at least one moving conveyor having second positioning structures releasably coupled to first positioning structures, means for feeding a green tyre component, a feeding mechanism for unwinding the green tyre component from the coil and feeding it towards a conveyor arranged at the respective station, and a cutting mechanism for cutting the green tyre component once a selected length has been unwound.

The methods of the type described in WO 01/32409 are aimed at increasing productivity in manufacturing processes of tyres built on a toroidal forming support and using elementary semi-finished products for building by automated, standardised steps, synchronised with each other. However, such: methods do not allow obtaining high technological flexibility. In fact, such methods are suitable for producing tyres that differ in limited features, such as dimensions, presence or not of some structural components of the tyre—such as one or two carcass plies, reinforcing elements in bead zone—, arrangement of the coils of rubber metal wires forming the bead cores in the bead zone, more or less extended belt layer at zero degrees, presence of layer and sub-layer in the tread band.

The methods of the type illustrated in EP 0 776 756, on the other hand, are technologically more flexible as they allow obtaining tyres from semi-finished products having different features from one another, but they are limited in terms of productivity, for example as the type of tyre to be produced changes, and they require large sized plants for their implementation.

The processes described in WO 09/040594 are similar to those of the type illustrated in EP 0 776 756 in terms of productivity and more flexible compared to the processes of the type described in WO 01/32409, however also the technological flexibility of such processes is limited. In fact, while such processes allow concurrently producing tyres of different sizes and with different structural components, they require the selection of built structural components starting from a limited number of semi-finished products. In processes of this type, in fact, once the building of tyres with predetermined elementary semi-finished products has started, the production must be stopped in order to change the selected semi-finished products, with consequent production drawbacks.

Moreover, the Applicant has noted that in the building tyres plants that use elementary semi-finished products of the type illustrated above, the management of a large number of materials and/or semi-finished products causes problems in synchronising the production steps of the various portions of the tyre and thereby problems in the general management of the production plant with negative consequences on productivity.

The Applicant has thus perceived that in order to build tyres with very different technological requirements from one another, improving the productivity of the processes of the type shown in WO 01/32409, increasing the flexibility of those of the type shown in WO 09/040594, and avoiding production plants of large dimensions and difficult to manage and synchronise like those illustrated in EP 0 776 756, it is necessary to have building plants and processes that provide for the possibility of selecting an elementary semi-finished product among different elementary semi-finished products at the time of using the semi-finished product without interrupting the building process.

The Applicant has then perceived that by applying a process for building green tyres that provides for feeding a plurality of elementary semi-finished products in each one of a plurality of work stations, it is possible to obtain a large variety of tyres with a high technological flexibility while keeping productivity high as well.

The Applicant has found that with a building process and plant wherein at least two work stations, adapted to build structural components of the tyre, are provided with a plurality of feeding units of elementary semi-finished products, wherein the elementary semi-finished products are different from one another and are preferably arranged and/or stored in advance, it is possible to build tyres differing not only by size, but also by type and in particular by type of elementary semi-finished products.

In particular, according to a first aspect thereof, the invention relates to a process for building different types of green tyres for vehicle wheels for each tyre size, through the use of elementary semi-finished products, in a building plant comprising a plurality of work stations, the process comprising:

a) building a carcass structure of a green tyre, said carcass structure comprising at least one carcass ply and a pair of annular anchoring structures;

b) building a crown structure of a green tyre, said crown structure comprising at least one belt structure and a tread band;

c) providing, in each of at least two work stations, at least one first feeding unit of a first elementary semi-finished product and one second feeding unit of a second elementary semi-finished product, said at least one first and one second elementary semi-finished products being different to one another;

d) building, in each of said at least two work stations, at least one portion of a structural component of the tyre being processed starting from at least one of said first and second elementary semi-finished products.

The Applicant believes that since said process is compatible with the use of different elementary semi-finished products for each tyre being produced, it allows obviating the aforementioned disadvantages of poor technological flexibility, keeping high performance quality of the finished product and high productivity.

The process according to the present invention therefore is technologically flexible and efficient.

The Applicant has then found that with a plant for building green tyres comprising at least two stations adapted to build structural components of the tyre by the use of elementary semi-finished products selected among a plurality of semi-finished products fed in each one of the same stations, it is possible to build tyres much different from each other with a high productivity.

In particular, according to a second aspect thereof, the invention relates to a plant for building different types of green tyres for vehicle wheels for each tyre size, through the use of elementary semi-finished products fed into a plurality of work stations, said plant comprising:

at least one first and one second work station, each fed by at least one first and one second elementary semi-finished product which are different to one another;

at least one first feeding unit (12) of said first elementary semi-finished product and one second feeding unit (12) of said second elementary semi-finished product for each of said work stations fed by said at least one first and one second elementary semi-finished product; wherein:

each of said first and second work station is adapted to build at least one portion of a structural component of the tyre being processed starting from at least one elementary semi-finished product selected between said first and second elementary semi-finished products fed into the work station itself.

Finally, the Applicant has found that by providing a method that provides for feeding $n_k$ elementary semi-finished products differing from one another to each k-th work station of m work stations fed by said $n_k$ elementary semi-finished products, with k ranging from 1 to m, it is possible to obtain $n_1 \cdot n_2 \cdot n_3 \ldots \cdot n_m$ that is $\pi_{k=1, m} n_k$ different types of green tyres.

By providing m and each $n_k$ greater than or equal to two, it is possible to achieve a high technological flexibility.

In particular, according to a third aspect thereof, the invention relates to a method for building different types of green tyres for vehicle wheels for each tyre size, through the use of elementary semi-finished products, in a building plant comprising a plurality of work stations, said method comprising:

feeding $n_k$ different elementary semi-finished products into each k-th work station of m work stations fed by said $n_k$ elementary semi-finished products;

building, in each k-th work station, at least one portion of a structural component of the tyre being processed starting from at least one elementary semi-finished product selected from said $n_k$ elementary semi-finished products fed into the work station itself;

said different types of green tyres for each size being equal to $$\pi_{k=1,m} n_k$$

m and each $n_k$ being greater than or equal to 2. As $n_k$ and m change, and in particular as they increase, such method allows building a very large number of different tyres for each size, achieving a higher technological flexibility with the same plant productivity.

The present invention, in at least one of the above aspects thereof, can have at least one of the following preferred features.

According to a preferred embodiment of the process of the invention, the building of at least one portion of a structural component of the tyre being processed from at least one of said first and second elementary semi-finished products, in each of said at least two work stations comprises at least one among:

applying a first belt strip;

applying a second belt strip in a position radially external to said first belt strip;

applying at least one first layer of textile or metal cords, arranged circumferentially in a position radially external to the radially external belt strip, and applied at least at its axially external portions;

applying a first carcass ply;

applying a second carcass ply in a position radially external to said first carcass ply.

Preferably, building the crown structure comprises:

building the tread band through winding of at least one continuous elongated element of elastomeric material on a surface radially external to a forming drum according to adjacent and/or radially juxtaposed coils.

Even more preferably, the building of said tread band is carried out through the use of at least two continuous elongated elements of different elastomeric materials.

According to a particularly preferred embodiment, the building of the tyre being processed is carried out on at least one forming drum.

Advantageously, the building of the carcass structure of the tyre being processed is carried out on a first forming drum in at least one carcass structure building line and the building of the crown structure of the tyre being processed is carried out on at least one second forming drum in at least one crown structure building line.

Moreover, the process according to the invention preferably comprises:

e) toroidally shaping the carcass structure assembling it at the crown structure in at least one assembling and shaping work station of the tyre being processed.

Advantageously, each carcass structure is associated with the respective first forming drum on which it is built up to the end of the shaping and assembly of the tyre being processed.

Preferably, the process of the invention provides for arranging said at least one first and one second elementary semi-finished products in an elementary semi-finished products arranging line.

Advantageously, the process of the invention further provides for transferring said at least one first and one second elementary semi-finished products in respective temporary storage units.

According to a preferred embodiment, the process also comprises transferring said at least one first and one second elementary semi-finished products from temporary storage units into the corresponding feeding units of the corresponding work stations.

Advantageously, the tyres being processed are transferred from one work station to the next work station by means of at least one robotised arm.

According to a preferred embodiment, the plant of the invention comprises at least one temporary storage unit of elementary semi-finished products.

Advantageously, the work stations fed by at least one first and one second elementary semi-finished product are four.

Preferably, the different elementary semi-finished products fed into each of said first and second work station are two.

Preferably, each work station fed by said first and second elementary semi-finished products is provided with corresponding feeding units of semi-finished products.

According to a preferred embodiment, the building plant further comprises an elementary semi-finished products arranging line.

Advantageously, at least one of said at least one first and one second work station fed by at least one first and one second elementary semi-finished product comprises one among the following work stations:

first belt application work station provided with devices for applying at least one first belt strip;

second belt application work station provided with devices for applying a second belt strip in a position radially external to said first belt strip;

cord application work station provided with devices for applying at least one first layer of textile or metal cords, arranged circumferentially on the radially external belt strip, applied at least at its axially external portions;

a ply application work station provided with devices for applying at least one first carcass ply.

The plant preferably further comprises at least one forming drum whereon the tyre is built.

According to a preferred embodiment, the plant further comprises:

at least one carcass structure building line on a first forming drum, said carcass structure comprising at least one carcass ply and a pair of annular anchoring structures;

at least one crown structure building line on a second forming drum, said crown structure comprising at least one belt structure and a tread band.

At least one assembling and shaping work station of the tyre being processed is also advantageously provided, adapted to shape said carcass structure assembling it at said crown structure so as to obtain a green tyre.

Preferably, the plant of the invention comprises at least one tread band building work station, provided with at least one application device of said tread band adapted to deposit a continuous elongated element of elastomeric material winding it onto a surface radially external to a forming drum, according to adjacent and/or radially juxtaposed coils.

Advantageously, said tread band building work station comprises at least two of said application devices, each dispensing a continuous elongated element of elastomeric material different to the other one.

According to preferred embodiments of the invention, the plant further comprises devices for transferring the tyre being processed from one work station to the next work station.

Preferably, said transfer devices comprise at least one robotised arm.

According to preferred embodiments of the method of the invention, the number m of work stations fed by said $n_k$ elementary semi-finished products is larger than or equal to 3.

More preferably, m is equal to 4.

According to a preferred embodiment of the method of the invention, the number $n_k$ of, elementary semi-finished products fed into the k-th station is equal to 2 in each k-th work station.

Advantageously, at least one $n_k$ of a k-th work station is greater than or equal to 3.

According to an embodiment of the method of the invention, each elementary semi-finished product fed into a k-th work station is different from each elementary semi-finished product fed into a different k-th work station.

Preferably, each elementary semi-finished product fed into a k-th work station is different from all of the remaining elementary semi-finished products fed into the remaining work stations of m work stations.

Preferably, the method of the invention further comprises:

storing elementary semi-finished products, previously arranged, in respective temporary storage units of elementary semi-finished products.

And advantageously, also:

transferring said elementary semi-finished products, arranged in an elementary semi-finished products arranging line, into the respective temporary storage units.

According to preferred embodiments, the method of the invention further comprises:

transferring said $n_k$ elementary semi-finished products from the temporary storage units into corresponding semi-finished product feeding units of the corresponding k-th work stations.

Preferably, the building of at least one portion of a structural component of the tyre being processed starting from at least one elementary semi-finished product selected from said $n_k$ elementary semi-finished products fed into the k-th work station comprises:

winding at least one continuous elongated element of elastomeric material onto a surface radially external to a forming drum according to adjacent and/or radially juxtaposed coils.

More preferably, said continuous elongated elements are two and are made from different elastomeric materials.

BRIEF DESCRIPTION OF THE DRAWINGS

Further features and advantages of invention will appear more clearly from the following description of some preferred examples of building plants, processes and methods according to the invention, made by way of an indicative non-limiting example with reference to the annexed drawings, wherein:

With reference to FIG. 1, reference numeral 1 globally indicates a plant for building green tyres for vehicle wheels.

Figure 1:
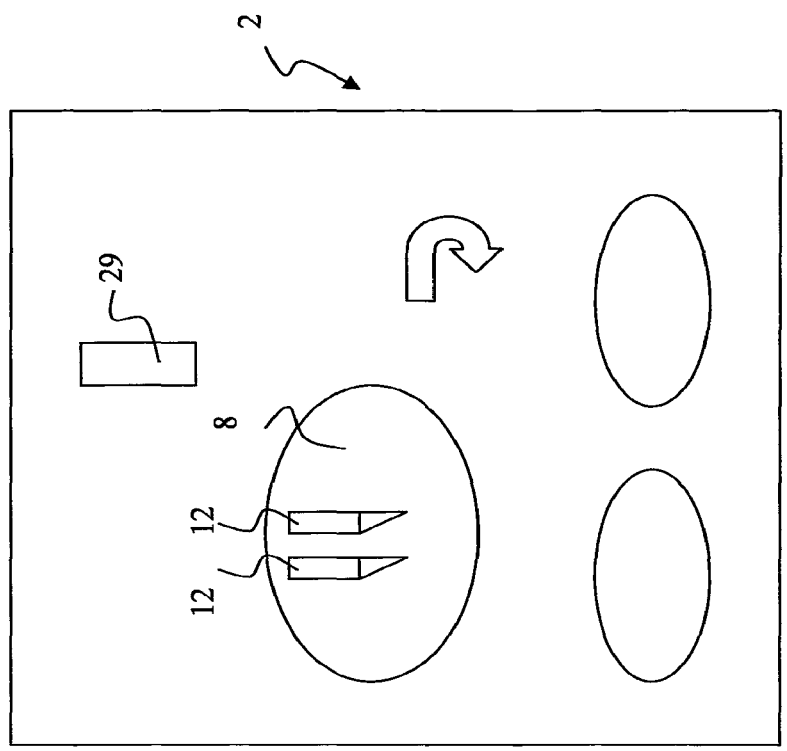
FIG. 1 shows a schematic layout of a plant for building green tyres for vehicle wheels wherein the method and the process according to a first embodiment of the present invention are carried out.
Figure 1:
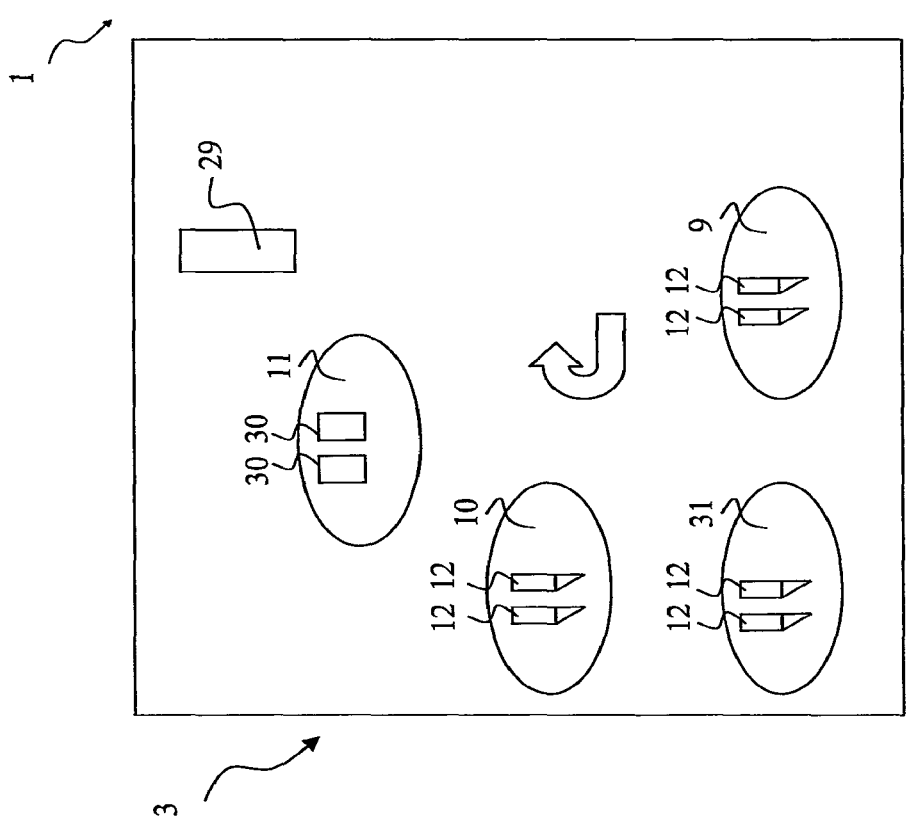

According to the first preferred embodiment shown in FIG. 1, plant 1 comprises a carcass structure building line 2 and a crown structure building line 3.

The carcass structure building line 2 comprises a plurality of work stations and at least one first forming drum whereon the carcass structure is built; likewise, the crown structure building line 3 comprises a plurality of work stations and at least one second forming drum wherein the crown structure is built.

The carcass structure of the tyre to be built in such plant 1 comprises at least one carcass ply and a pair of annular anchoring structures and the crown structure comprises at least one belt structure and a tread band.

Plant 1 comprises a plurality of assembling and shaping work stations 4 of the tyre being processed which are adapted to shape the carcass structure assembling it to the crown structure so as to obtain a green tyre.

According to the present invention, plant 1 comprises at least one first and one second work station, each fed by at least one first and one second elementary semi-finished product which are different to one another.

The elementary semi-finished products may differ, for example, by type of elastomeric material; density, that is number of cords per unit of width in cross section with respect to the semi-finished product; type of cords: textile, metal, scheme (starting from the elementary filaments).

Such semi-finished products are fed to the respective work stations by means of corresponding feeding units 12.

Therefore, plant 1 comprises at least one first feeding unit 12 of said first elementary semi-finished product and one second feeding unit 12 of said second elementary semi-finished product for each one of the at least two work stations fed by at least one first and one second elementary semi-finished product.

According to the invention, each of said first and second work station is adapted to build at least one portion of a structural component of the tyre being processed starting from at least one elementary semi-finished product selected between said first and second elementary semi-finished products fed into the work station itself.

Preferably, the feeding units 12 of elementary semi-finished products comprise semi-finished product dispensing devices.

Plant 1 further comprises temporary storage units 29 of elementary semi-finished products. Such temporary storage units 29 preferably comprise coils of elementary semi-finished products.

In the first embodiment shown in FIG. 1, there are shown four work stations fed by two elementary semi-finished products by means of the corresponding feeding units 12:
- a first belt application work station 9 provided with devices for applying at least a first belt strip on said second forming drum;
- a second belt application work station 31 provided with devices for applying a second belt strip in a position radially external to said first belt strip;
- a cord application work station 10 provided with devices for applying at least one first layer of textile or metal cords, arranged circumferentially, that is, at zero degrees, on the radially external belt strip, applied at least at its axially external portions;
- a ply application work station 8 provided with devices for applying at least one first carcass ply on said first forming drum.

Such FIG. 1 also shows a tread band building station 11, provided with at least two devices 30 for applying said tread band. Each of such application devices 30 is adapted to lay a continuous elongated element of elastomeric material by winding it on a surface radially external to the second forming drum, more precisely on the radially outer surface of the belt structure already built, according to adjacent and/or radially juxtaposed coils.

Figure 2:
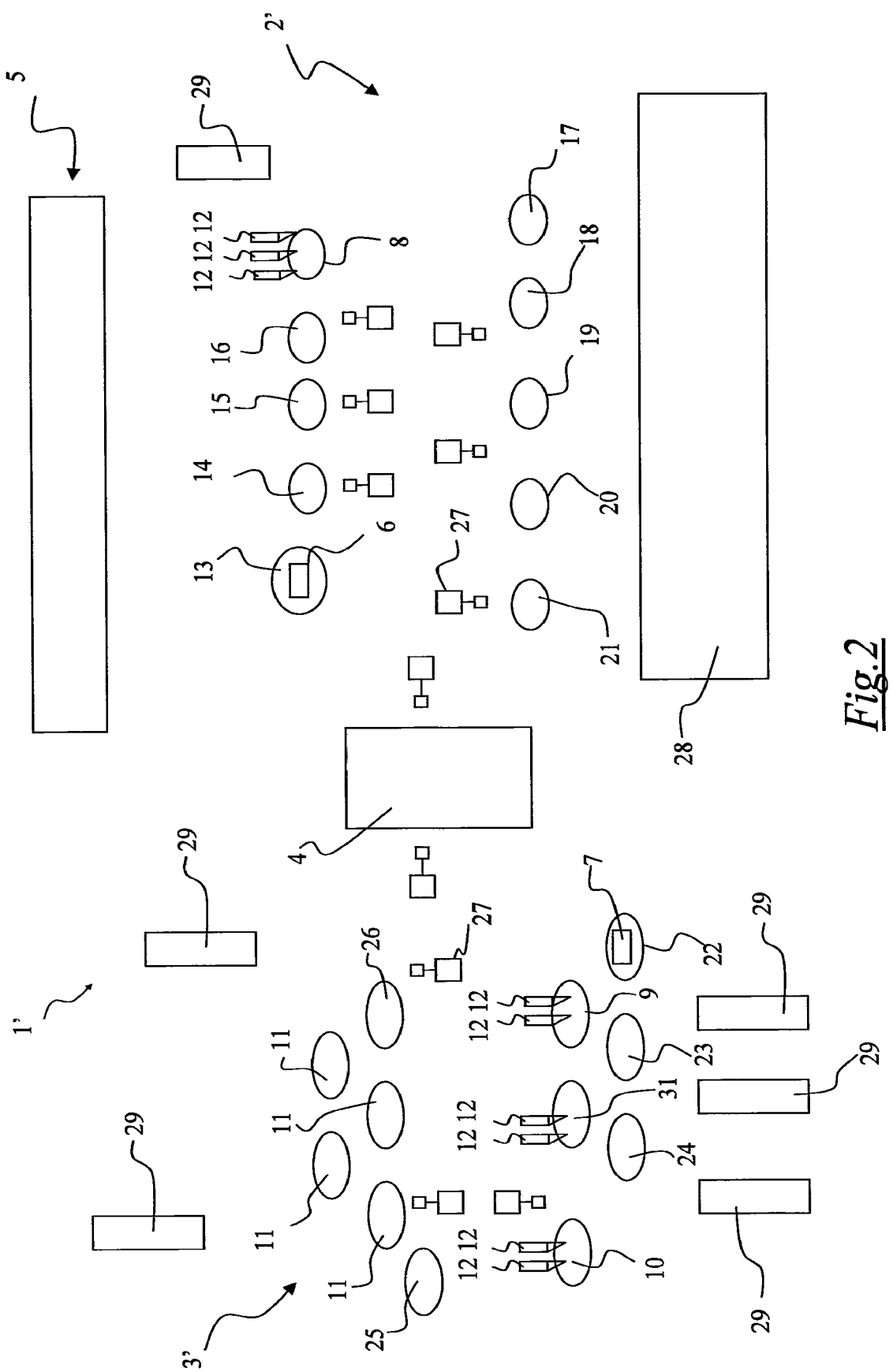
FIG. 2 shows a schematic layout of a plant for building green tyres for vehicle wheels wherein the method and the process according to a further embodiment of the present invention are carried out.

With reference now to FIG. 2, it is seen that plant 1' comprises anything described before for the first embodiment plus further elements that shall be described hereinafter. In the two figures, same reference numbers correspond to same elements.

Plant 1' comprises a carcass structure building line 2', a crown structure building line 3' and an assembling and shaping work station 4, similar to plant 1 relating to the first embodiment.

The carcass structure building line 2' comprises a plurality of work stations and at least one first forming drum 6 whereon the carcass structure is built; likewise, the crown structure building line 3 comprises a plurality of work stations and at least one second forming drum 7 wherein the crown structure is built.

Plant 1' comprises an elementary semi-finished products arranging line 28 adapted to arrange elementary semi-finished products which are in turn adapted to be fed into the work stations through the feeding units 12.

According to the embodiment shown by way of an example in FIG. 2, the carcass structure building line 2' of plant 1' further comprises:
- a station for applying a reinforcing fabric 13 provided with devices for applying at least one bead reinforcing fabric on the forming drum;
- a first abrasion-proof application station 14 provided with devices for applying at least a first portion of an abrasion-proof element in a position radially external to said forming drum;
- a liner application station 15 provided with devices for applying a liner layer in a position radially external to the forming drum;
- a sub-liner application station 16 provided with devices for applying an sub-liner layer in a position radially external to said liner;
- a ply application station 8 provided with devices for applying at least a first carcass ply in a position radially external to the sub-liner layer;
- a station for applying first intermediate elements 17 provided with devices for applying a plurality of first intermediate elements at said at least one carcass ply;
- an internal reinforcement application station 18 provided with devices for applying a plurality of internal reinforcements at said first intermediate elements;
- a station for applying annular anchoring structures 19 provided with devices for applying at least one pair of annular anchoring structures to the axially opposite ends of said at least one carcass ply;
- a second abrasion-proof application station 20 provided with devices for applying at least a second portion of the abrasion-proof element;
- a first side wall building station 21 provided with devices for applying at least a first portion of sides of the tyre being processed.

The carcass structure building line 2' of plant 1' may optionally comprise the following work stations not shown in the figures:
- a self-sealing material application station provided with devices for applying a layer of self-sealing material in a position radially external to the sub-liner layer;
- an external reinforcement application station provided with devices for applying a plurality of external reinforcements at said at least one carcass ply;
- an external ply application station provided with devices for applying an external ply at said at least one carcass ply.

The crown structure building line 3' of plant 1' comprises:
- an under-belt layer application station 22 provided with devices for applying an under-belt layer on the forming drum;
- a first belt application station 9 provided with devices for applying at least a first belt strip in a position radially external to said forming drum;
- a second intermediate elements laying station 23 provided with devices for laying at least one second intermediate element on the first belt strip;
- a second belt application station 31 provided with devices for applying a second belt strip in a position radially external to said second intermediate elements;
- a belt turning station 24 provided with devices for turning the ends of the first belt strip on the second belt strip;
- a cord application work station 10 provided with devices for applying at least a first layer of cords, arranged circumferentially, that is, at zero degrees, on the radially external belt strip, applied at least at the axially external portions thereof;
- one sub-layer application work station 25 provided with devices for applying at least one sub-layer in a position radially external to the cord layer;
- four tread band building work stations 11, each provided with devices for applying at least one tread band in a position radially external to said sub-layer;

a second side wall building station 26 provided with devices for building at least a second portion of side walls in a position axially external to the tread band.

Plant 1' further comprises units 12 for feeding elementary semi-finished products.

In particular, at each one of the following work stations:
first belt application station 9;
second belt application station 31;
cord application station 10;
plant 1' is provided with two feeding units 12 of two corresponding different elementary semi-finished products fed in each one of said stations.

At the ply application station 8, on the other hand, plant 1' comprises three feeding units 12 of three corresponding different elementary semi-finished products fed into the same ply application station 8.

Also plant 1' comprises temporary storage units 29 of elementary semi-finished products. Such temporary storage units 29 of elementary semi-finished products preferably comprise coils of elementary semi-finished products.

Plant 1' further comprises devices for transferring the tyre being processed from one work station to the next work station.

In particular, each one of said transfer devices comprises one robotised arm 27.

Plant 1' also comprises a moulding and curing line 5 of the green tyre built.

According to alternative embodiments not shown in the figure, it is possible to provide two or more ply application stations, in particular one adapted to apply the first carcass ply and the further stations adapted to apply further carcass plies.

Further embodiments of the plant of the invention, not shown in the figures, provide a single station for applying one or more belt strips.

With reference to the building plant 1 illustrated in FIG. 1, a preferred embodiment of a process for building a tyre according to the invention shall now be described.

The carcass structure of a green tyre is built by the use of elementary semi-finished products fed into the work stations of the carcass structure building line 2.

The carcass structure of the tyre being processed is transferred from one work station to the next one, preferably in the direction indicated by the arrow in FIG. 1, up to the completion of the same carcass structure.

During the building of the carcass structure, once the tyre being processed has been transferred into the ply application station 8, which is provided with two feeding units 12 of semi-finished products, it is possible to select one of the two semi-finished products fed therein based on the technological requirements of the tyre to be produced. Once a first carcass ply has been applied using the selected semi-finished product, it is possible to apply a second ply in a position radially external to the first ply by selecting one of the two semi-finished products fed into the ply application station 8 again, or transfer the tyre into the next work station.

Once the tyre being processed has been transferred outside the ply application station 8, the latter receives a further tyre being processed for which it is again possible to select one of the two elementary semi-finished products fed therein, in order to apply at least a first carcass ply, by building a carcass structure equal to or different from the previous one.

The crown structure of the tyre being processed, in the meantime, is built in the crown structure building line 3 by the use of elementary semi-finished products fed into the work stations of the same crown structure building line 3.

The crown structure of the tyre being processed is transferred from one work station to the next one, preferably in the direction indicated by the arrow in FIG. 1, up to the completion of the crown structure.

During the building of the crown structure, once the latter has been transferred into the first belt application station 9, into the second belt application station 31 and into the cord application station 10, in each one of such stations it is possible to select one of the two elementary semi-finished products fed therein, consequently obtaining different crown structures according to the combination of the selected semi-finished products.

The crown structures and the carcass structures thus obtained are then assembled in an assembling and shaping station 4 from which different types of built tyres are obtained.

With reference to the building plant 1' illustrated in FIG. 2, a second preferred embodiment of a process for building a tyre according to the invention shall now be described.

Elementary semi-finished products are arranged in an elementary semi-finished products arranging line 28.

Such elementary semi-finished products are transferred into corresponding temporary storage units 29 where they remain up to the transfer into corresponding feeding units 12.

According to the second embodiment, the process of the invention provides the arrangement of three feeding units 12 of three corresponding elementary semi-finished products differing from each other, adapted to feed the ply application station 8. The latter is adapted to apply at least one first ply of the tyre being processed starting from at least one of said three elementary semi-finished products.

The process further provides for arranging two feeding units 12 of two corresponding different elementary semi-finished products, adapted to feed each one among: the first belt application work station 9, the second belt application work station 31 and the cord application work station 10. In this way it is possible to select at least one elementary semi-finished product between the two semi-finished products fed into the corresponding stations for each one of the following process operations:

applying a first belt strip;
applying a second belt strip in a position radially external to said first belt strip;
applying at least one first layer of textile or metal cords, arranged circumferentially in a position radially external to the radially external belt strip, and applied at least at its axially external portions.

In a preferred case, a carcass structure of a tyre being processed is carried out on a first forming drum 6 in one carcass structure building line 2' by the following process operations:

applying at least one bead reinforcing fabric in a position radially external to the first forming drum 6;
applying at least one first portion of an abrasion-proof element in a position radially external to the first forming drum 6;
applying a liner layer in a position radially external to the forming drum;
applying an under-liner layer in a position radially external to said liner;
applying at least one first carcass ply in a position radially external to the under-liner layer using at least one elementary semi-finished product selected among the three elementary semi-finished products fed into the ply application station 8;

applying a plurality of first intermediate elements at said at least one carcass ply;

applying a plurality of internal reinforcements at said first intermediate elements;

applying at least one pair of annular anchoring structures to the axially opposite ends of said at least one carcass ply;

applying at least a second portion of the abrasion-proof element;

applying at least one first portion of side walls of the tyre being processed.

According to alternative embodiments, the carcass structure building also comprises at least one of the following process operations:

applying a layer of self-sealing material;

applying a plurality of external reinforcements at said at least one carcass ply;

applying an external ply at said at least one carcass ply.

In a preferred case, a crown structure of a tyre being processed is carried out on a second forming drum in a crown structure building line 3' by the following process operations:

applying an under-belt layer in a position radially external to the second forming drum 7;

applying at least one first belt strip in a position radially external to the second forming drum 7 using at least one elementary semi-finished product selected between the two elementary semi-finished products fed into the first belt application station 9;

laying at least a second intermediate element on the first belt strip;

applying a second belt strip in a position radially external to said first belt strip using at least one elementary semi-finished product selected between the two elementary semi-finished products fed into the second belt application station 31;

turning the ends of the first belt strip on the second belt strip;

applying at least one first layer of metal or textile cords, arranged circumferentially in a position radially external to the radially external belt strip, using at least one elementary semi-finished product selected between the two elementary semi-finished products fed into the cord application station 10;

applying at least one sub-layer on the cord layer;

applying at least one tread band in a position radially external to said sub-layer;

applying at least a second portion of side walls of the tyre being processed in a position axially external to said tread band.

According to such second preferred embodiment of the process of the invention, the tread band is built by winding two continuous elongated elements of elastomeric material differing from each other at least by composition, on a surface radially external to the second forming drum 7 according to adjacent and/or radially juxtaposed coils.

Once the different carcass and crown structures have been built, the process provides for toroidally shaping the carcass structures assembling them to the corresponding crown structures in one assembling and shaping work station 4 of the tyre being processed.

Moreover, according to such embodiment, each carcass structure is associated to the respective first forming drum 6 whereon it is assembled up to the end of the shaping and assembly of the tyre being processed.

The tyres being processed are preferably transferred from one work station to the next work station by means of at least one robotised arm 27.

Once the tyre building has been completed, it is possible to provide a curing and moulding operation of the tyre in a suitable moulding and curing line 5.

With reference to FIGS. 1 and 2, the method for building different types of green tyres for vehicle wheels, for each tyre size, according to the invention, shall now be described.

The method of the invention provides for feeding $n_k$ different elementary semi-finished products into each k-th work station of m work stations fed by said $n_k$ elementary semi-finished products. In other words, each k-th station of m work stations fed by a plurality of elementary semi-finished products is fed by a variable number $n_k$ of different elementary semi-finished products.

Thus, $n_1$ shall be the number of semi-finished products fed into the first work station; $n_2$ shall be the number of semi-finished products fed into the second work station and so on.

The method then provides for building, in each k-th work station, at least one portion of a structural component of the tyre being processed starting from at least one elementary semi-finished product selected from said $n_k$ elementary semi-finished products fed into the work station itself.

According to the method of the invention, said different types of green tyres for each size are equal to $$\pi_{k=1,m} n_k$$

wherein m and each $n_k$ are greater than or equal to 2.

By applying such method to the shown embodiments it results the following.

In the first embodiment, the stations fed by a plurality of semi-finished products are 4 and the number of semi-finished products fed in each one of the four stations is equal to 2, that is m=4 and $n_1=n_2=n_3=n_4=2$.

Therefore, using the method of the invention it is possible to build 2×2×2×2, that is 16, different types of tyres for each tyre size without interrupting the production cycle.

In the second embodiment, the stations fed by a plurality of semi-finished products are 4 and the number of semi-finished products fed into the first one of said stations is equal to 3, whereas in the remaining second, third and fourth of said four stations it is equal to 2, that is, m=4; $n_1=3$; $n_2=n_2=n_4=2$.

Therefore, using the method of the invention it is possible to build 3×2×2×2, that is 24, different types of tyres for each tyre size without interrupting the production cycle.

Finally, it should be noted that thanks to the feeding devices provided at the work stations adapted to build the tread band, the number of different types of tyre that can be made for each size may be larger. In fact, for example, in a work station adapted to build the tread band, provided with two feeding devices of continuous elongated elements differing from each other (used for building the entire tread band), in the first example shown above we shall get 16×2, that is, 32 types of different tyres, in the second one 24×2, that is, 48.

The building plants 1 and 1', schematically shown in the figures, therefore allow obtaining different types of green, tyres for each tyre size. Of course, the number of tyre types that can be built by the method and the process of the invention, and therefore the flexibility of such method and process, further increases if we think that they also allow building tyres of a different size.

Within the scope of the above present description and in the following claims, all numerical values indicating amounts, parameters, percentages and so on are always to be deemed as preceded by the term "about", if not otherwise stated. Moreover, all numerical value ranges include all possible combinations of the maximum and minimum numerical values and all possible intermediate ranges, besides those specifically indicated in the text.

The invention claimed is:

1. A method for building different types of green tyres for vehicle wheels for each tyre size of different tyre sizes in a building plant comprising a plurality of work stations, the method comprising:
building in said plurality of work stations a carcass structure and a crown structure of a green tyre of said green tyres, wherein said carcass structure comprises at least one carcass ply and a pair of annular anchoring structures and
said crown structure comprising at least one belt structure and a tread band;
wherein in each of at least two work stations of said plurality of work stations, the respective work station comprises at least one first feeding unit of a first elementary semi-finished product and at least one second feeding unit of a second elementary semi-finished product, and the first and the second elementary semi-finished products are different from one another by at least one of: a type of elastomeric material, a density of cords, and a type of cord; and
building, in each of said at least two work stations of the plurality of work stations, at least one portion of a structural component of the carcass structure, the crown structure or both of the tyre processed starting from the first elementary semi-finished product or the second elementary semi-finished product;
wherein of the first and the second elementary semi-finished products each comprise at least one of: elongated elements of elastomeric material having at least one textile or metal reinforcing cord therein; and strips of elastomeric material obtained by cutting to size said elongated elements of elastomeric material having at least one textile or metal reinforcing cord therein.

2. The method according to claim 1, wherein the step of building at least one portion of a structural component of the tyre in each of said at least two work stations comprises at least one of the following:
applying a first belt strip;
applying a second belt strip in a position radially external to said first belt strip;
applying at least one first layer of textile or metal cords, arranged circumferentially in a position radially external to the second belt strip, and applied at least to axially external portions thereof;
applying a first carcass ply; and
applying a second carcass ply in a position radially external to said first carcass ply.

3. The method according to claim 1, wherein the step of building the crown structure comprises:
building the tread band through winding of at least one continuous elongated element of elastomeric material on a surface radially external to a forming drum to form coils.

4. The method according to claim 3, wherein the step of building the tread band is carried out through the use of at least two continuous elongated elements of different elastomeric materials.

5. The method according to claim 1, wherein:
the step of building the carcass structure of the tyre processed is carried out on a first forming drum in the carcass structure building line; and
the step of building the crown structure of the tyre processed is carried out on at least one second forming drum in the crown structure building line.

6. The method according to claim 5, further comprising:
toroidally shaping the carcass structure by assembling the carcass structure with the crown structure in at least one assembling and shaping work station of the tyre processed,
wherein each carcass structure is associated with a respective first forming drum on which said carcass structure is built, until the end of the assembling and shaping of the tyre processed.

7. The method according to claim 1, further comprising:
arranging the first and the second elementary semi-finished products in an elementary semi-finished products arranging line.

8. The method according to claim 7, further comprising:
transferring the first and the second elementary semi-finished products into respective temporary storage units.

9. The method according to claim 1, further comprising:
transferring the first and the second elementary semi-finished products from temporary storage units into the corresponding feeding units of the corresponding work stations.

10. The method for building green tyres according to claim 1, further comprising transferring the tyres processed from one work station to the next work station by at least one robotised arm.

11. A method for building different types of green tyres for vehicle wheels for each tyre size of different tyre sizes in a building plant, said method comprising:
feeding $n_k$ different elementary semi-finished products into each of a k-th work station of m work stations, wherein k ranges from 1 to m, and each of the k-th work station comprises at least two feeding units of the $n_k$ elementary semi-finished products; and
building, in each k-th work station, at least one portion of a structural component of the tyre processed starting from at least one elementary semi-finished product selected from said $n_k$ elementary semi-finished products fed into the work station itself by the at least two feeding units of the k-th work station;
wherein said different types of green tyres are equal to $$\pi_{k=1,m} \, n_k,$$

m and each $n_k$ are greater than or equal to 2, $n_k$ is the number of different elementary semi-finished products fed into the k-th work station of said m work stations;
of said $n_k$ different elementary semi-finished products, each comprise at least one of: elongated elements of elastomeric material having at least one textile or metal reinforcing cord therein; and strips of elastomeric obtained by cutting to size said elongated elements of elastomeric material having at least one textile or metal reinforcing cord therein; and
said $n_k$ different elementary semi-finished products are different to one another by at least one of: a type of elastomeric material, a density of cords, and a type of cord.

12. The method according to claim 11, wherein m is greater than or equal to 3.

13. The method according to claim 11, wherein $n_k$ is equal to 2 in each k-th work station.

14. The method according to claim 11, wherein at least one $n_k$ of a k-th work station is greater than or equal to 3.

15. The method according to claim 11, further comprising:

transferring said elementary semi-finished products, arranged in an elementary semi-finished products arranging line, into respective temporary storage units.

16. The method according to claim 11, further comprising:

transferring said $n_k$ elementary semi-finished products from temporary storage units into the at least two feeding units of the k-th work stations.

17. The method according to claim 11, wherein the step of building at least one portion of a structural component of the tyre comprises:

winding at least one continuous elongated element of elastomeric material onto a surface radially external to a forming drum to form coils.

18. The method according to claim 17, wherein said continuous elongated elements are two and each comprises a different elastomeric material.

19. The method according to claim 11, wherein each elementary semi-finished product fed into a k-th work station of the m work stations is different from each elementary semi-finished product fed into a different k-th work station of the m work stations.

20. The method according to claim 11, wherein each elementary semi-finished product fed into a k-th work station of the m work stations is different from the elementary semi-finished products fed into any other k-th work station of them work stations.

* * * * *